United States Patent Office 3,203,860
Patented Aug. 31, 1965

3,203,860
1,2,3,5,6,11b - HEXAHYDROINDOLO[3,2 - g]INDOL-
IZINYL-2-METHYL 3,4,5 - TRIMETHOXYBENZO-
ATE AND SALTS THEREOF
Yao Hua Wu and Harold J. Rhodes, Evansville, Ind., as-
signors to Mead Johnson & Company, Evansville, Ind.,
a corporation of Indiana
No Drawing. Filed Mar. 21, 1963, Ser. No. 266,802
8 Claims. (Cl. 167—55)

The present invention is concerned with the substances of the following structure and the acid addition salts thereof. The chemical name for this structure is 1,2,3,5,6,11b-hexahydro[3,2-g]indolizinyl-2-methyl 3,4,5 - trimethoxybenzoate. The numbering system of this ring structure for nomenclature purposes is indicated in the formula.

Formula I

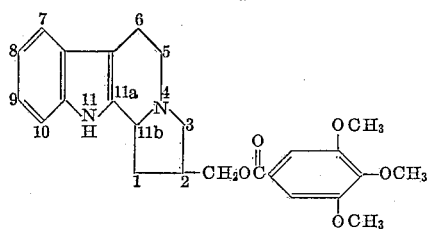

Substances of the above structure and the pharmaceutically acceptable acid addition salts thereof are useful as medicinal agents. They elicit sedative, tranquilizer, muscle relaxant, and hypotensive effects on administration to mammals in doses of from 0.1 to 50 mg./kg. of body weight. One embodiment of this invention involves administering an effective but non-toxic dose of the above substances to a mammalian host. By pharmaceutically acceptable acid addition salts is meant those salts which are non-toxic in the doses employed and which have physical properties adapting them to pharmaceutical use. These include the hydrochloride, hydrobromide, hydroiodide, sulfate, phosphate, nitrate, mucate, succinate, maleate, fumarate, gluconate, citrate, ascorbate, benzoate, pamoate, methanesulfonate, p-toluenesulfonate, tartrate, tannate, d-malate, l-malate, mandelate, etc., salts. They are prepared by reaction of the substances of Formula I with at least one equivalent of the appropriate acid, preferably in solution in a reaction inert solvent.

Since there are two asymmetric carbon atoms in the structure of Formula I, various stereoisomers exist, namely two racemates, each consisting of a pair of optical isomers. Each of these isomers is considered within the scope of this invention. Other salts which may or may not be pharmaceutically acceptable by virtue of excessive toxicity or other reasons are, nevertheless, considered within the scope of the present invention also, in view of their utility for preparative purposes including the synthesis, purification, and resolution of the individual isomers. Salts of this type include the perchlorate, oxalate, the d-camphorsulfonate, etc.

The substances of Formula I are prepared by esterification of the alcohols of Formula II. The alcohols of Formula II are prepared as described in our copending application Serial Number 266,812, filed simultaneously herewith.

Formula II

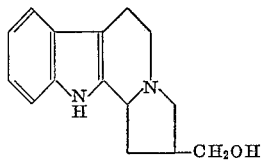

Various forms of trimethoxybenzoic acid are suitable for esterification purposes including the acid itself, the halides thereof such as trimethoxybenzoyl chloride and trimethoxybenzoyl bromide, the anhydride thereof, and the mixed anhydrides thereof such as trimethoxybenzoylformic anhydride, and the lower alkyl esters thereof such as the methyl and ethyl esters wherein the alkyl group contains up to four carbon atoms.

A reaction compatible solvent is preferably employed in conducting the process. By this is meant a solvent which is not destructive of either reactants or products. The reactants are preferably soluble in such solvent, and the desired product insoluble. Suitable reaction inert solvents include the liquid hydrocarbons, ethers, and tertiary amines. A preferred solvent is tetrahydrofuran, although solvents such as dioxane, diethyl ether, diisopropyl ether, dibutyl ether, pyridine, quinoline, and triethylamine are satisfactory. Due to their basic character, solvents of the latter type are useful when employing a trimethoxybenzoyl mixed anhydride esterifying agent.

The reaction is generally carried out at from about room temperature (25° C.) up to the refluxing temperature of the solvent at atmospheric pressure (200° C.), reflux temperature being preferred when using a trimethoxybenzoyl halide or anhydride as acylating agent. In some instances temperatures as low as ice temperature are, however, applicable.

When using trimethoxybenzoic acid itseslf or an ester thereof as acylating agent, the process may be carried out under convenient esterifying or transesterifying conditions such as refluxing the carbinol of Formula II or a lower alkanoic ester thereof such as the formate, acetate, or propionate therewith in an inert solvent containing a trace of a mineral acid or other strong acid. Basic catalysts such as the sodium alkoxides are preferred transesterification catalysts. Alternatively, esterifying catalysts such as dicyclohexylcarbodiimide may be employed with trimethoxybenzoic acid and a carbinol of Formula II.

A preferred method of operation when it is desired to prepare a pure racemate of pure optical isomer of Formula I is to use the corresponding purified racemate or optical isomer of the carbinol of Formula II. The preparation of such purified starting materials is also described in our copending patent application referred to above. It has been found that the use of concentrates of the respective isomers of the carbinol of Formula II rather than pure crystalline forms thereof is sometimes satisfactory for this purpose since purification of the corresponding pure isomer or racemate of the resulting trimethoxybenzoate of Formula I takes place during recovery thereof from the reaction mixture and purification.

EXAMPLE 1

1,2,3,5,6,1lb - hexahydroindolo[3,2 - g]indolizinyl - 2-methyl 3,4,5 - trimethoxybenzoate hydrochloride—racemate A, M.P. 208–209° C.—A mixture of 2-hydroxymethyl - 1,2,3,5,6,11b - hexahydronidolo[3,2 - g]indolizine (purified racemate, M.P. 190–195° C., dec.), 1.21 g. (5 mmoles), 3,4,5-trimethoxybenzoyl chloride, 1.16 g. (5 mmoles), and 250 ml. of tetrahydrofuran is stirred and refluxed for 6 hrs. The white crystalline solid which forms is collected on a filter. The crude product (1.70 g., 72%) melts at 202–204° C., dec. Recrystallization from acetone-ether yields the pure product as colorless prisms, M.P. 208–209° C.

Analysis.—C, 63.74; H, 6.48; N, 6.20, which corresponds to the molecular formula $C_{25}H_{28}N_2O_5 \cdot HCl$. Infrared absorption maxima are exhibited by the substance in a potassium bromide pellet at 0.5% concentration at the following wave lengths: 2.93, 3.16, 3.41, 3.86, 5.81, 6.31, 6.66, 6.83, 7.06, 7.47, 8.15, 8.44, 8.87, 9.96, 13.15 and 13.43μ. This substance has a solubility in water of 1 mg./ml. yielding a solution having pH between 5.6 and 5.7. When the solution is adjusted to pH 6.0, a precipitate forms. This substance has an $LD_{50}$ of 360 mg./kg. in the mouse, intraperitoneally. It is the preferred compound of the present invention for tranquilizer activity.

EXAMPLE 2

*1,2,3,5,6,11b - hexahydroindolo[3,2 - g]indolizinyl - 2-methyl 3,4,5 - trimethoxybenzoate hydrochloride—racemate B, M.P. 186–188° C. (dec.)*.—A mixture of 2-hydroxymethyl - 1,2,3,5,6,11b - hexahydroindolo[3,2 - g] indolizine (purified racemate, M.P. 165–168° C.), 4.85 g. (0.02 mole), 3,4,5-trimethoxybenzoyl chloride, 5.07 g. (0.02 mole), and 200 ml. of tetrahydrofuran is stirred and refluxed for 9 hrs. The viscous residue obtained after evaporation of the solvent is treated with excess 10% aqueous sodium bicarbonate. The mixture is extracted with three 100-ml. portions of methylene chloride. The combined extras are concentrated to a greenish-yellow residue weighing 8.2 g. Adsorption chromatographic purification of the crude base in methylene chloride on neutral aluminum yields 3.8 g. of racemate B in basic form. The hydrochloride salt is prepared therefrom by treatment in chloroform solution with one equivalent of hydrogen chloride, M.P. 186–188° C. (dec.) after recrystallization from acetone n-hexane. Yield: 1.68 g. (17.8%).

*Analysis*.—C. 63.19; H, 6.23; N, 6.03, which corresponds to the molecular formula $C_{25}H_{28}N_2O_5 \cdot HCl$. Infrared absorption maxima are exhibited by the substance in a potassium bromide pellet at 0.5% concentration at the following wave lengths: 2.93, 3.10, 3.33, 5.84, 6.22, 6.50, 6.88, 7.06, 7.37, 8.12, 8.39, 8.88, 9.98, 13.12, 13.43μ. This substance has a water solubility of 5 mg./ml. yielding a solution having pH 5.2. When the solution is adjusted to pH 5.9, a precipitate forms.

The substances prepared according to the preceding examples may be compounded for pharmaceutical purposes into dosage forms adapted for either parenteral or oral use including tablets, capsules, suspensions in flavored vehicles, solutions for injection and suspensions in vehicles suitable for intravenous or intramuscular use such as peanut oil. Preferred dosage units contain from 10–100 mg. Exemplary formulations of this type are illustrated below.

EXAMPLE 3

A dry blend of the following ingredients is prepared:

| | Kg. |
|---|---|
| 1,2,3,5,6,11b - hexahydroindolo[3,2 - g]indolizinyl-2-methyl 3,4,5-trimethoxybenzoate hydrochloride (Example 1) | 10.0 |
| Lactose | 14.8 |
| Magnesium stearate | 0.2 |
| Total | 25.0 |

This mixture is then employed to fill No. 2 hard gelatin capsules, each with 250 mg. of the blend containing 100 mg. of the active ingredient.

While several particular embodiments of this invention are shown above, it will be understood that the invention is not to be limited thereto, since many modifications may be made, and it is contemplated, therefore, by the appended claims to cover any such modifications as fall within the true spirit and scope of this invention.

What is claimed is:

1. A compound selected from the group consisting of substances of the formula

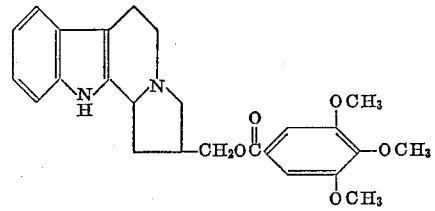

and the pharmaceutically acceptable acid addition salts thereof.

2. 1,2,3,5,6,11b - hexahydroindolo[3,2 - g]indolizinyl-2-methyl 3,4,5-trimethoxybenzoate hydrochloride having M.P. 208–209° C. (dec.).

3. 1,2,3,5,6,11b - hexahydroindolo[3,2 - g]indolizinyl-2-methyl 3,4,5-trimethoxybenzoate hydrochloride having M.P. 186–188° C. (dec.).

4. The process which comprises administering a pharmacodynamically effective non-toxic dose of a substance as claimed in claim 1 to a mammalian host to achieve at least one pharmacodynamic effect selected from among sedative, tranquilizer, muscle relaxant and hypotensive effects.

5. A pharmaceutical composition in dosage unit form comprising from 10 mg. to 100 mg. of a compound as claimed in claim 1 and a pharmaceutical carrier therefor.

6. The process which comprises reacting a compound of the formula

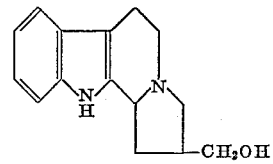

with a compound selected from the group consisting of trimethoxybenzoic acid and the lower alkyl esters, halides and anhydrides thereof under esterifying conditions.

7. The process of claim 6 wherein the purified racemate of the formula

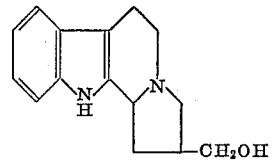

having M.P. 190–195° C. (dec.) is employed.

8. The process of claim 6 wherein the purified racemate of the formula

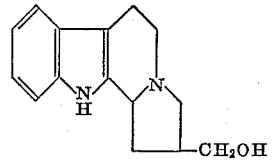

having M.P. 165–168° C. is employed.

No references cited.

WALTER A. MODANCE, *Primary Examiner*.

NICHOLAS S. RIZZO, *Examiner*.